United States Patent
Gunti et al.

(10) Patent No.: US 9,819,497 B2
(45) Date of Patent: Nov. 14, 2017

(54) AUTOMATED PROVISIONING OF CERTIFICATES

(71) Applicant: VMware, Inc., Palo Alto, CA (US)

(72) Inventors: Mukund Gunti, Sunnyvale, CA (US); Kalyan Ram Chintalapati, Santa Clara, CA (US); Suresh Sundriyal, Mountain View, CA (US); Tushar Thole, San Jose, CA (US); Swapnil Daingade, Sunnyvale, CA (US); Sridhar T Reddy, Foster City, CA (US); Anu Engineer, Sammamish, WA (US); Patrick William Penzias Dirks, Monte Sereno, CA (US); Ratnadeep Bhattacharjee, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 21 days.

(21) Appl. No.: 14/755,508

(22) Filed: Jun. 30, 2015

(65) Prior Publication Data

US 2017/0005808 A1    Jan. 5, 2017

(51) Int. Cl.
*H04L 29/06* (2006.01)
*H04L 9/32* (2006.01)

(52) U.S. Cl.
CPC ............ *H04L 9/3268* (2013.01); *H04L 9/321* (2013.01)

(58) Field of Classification Search
CPC .................................................... H04L 9/3268
See application file for complete search history.

(56) References Cited

U.S. PATENT DOCUMENTS

| | | | |
|---|---|---|---|
| 9,197,630 B2 | 11/2015 | Sharif et al. | |
| 9,225,743 B1 | 12/2015 | Naik | |
| 9,432,356 B1* | 8/2016 | Johansson | H04L 63/0823 |
| 2002/0184493 A1 | 12/2002 | Rees | |
| 2004/0249712 A1 | 12/2004 | Brown et al. | |
| 2005/0177716 A1 | 8/2005 | Ginter et al. | |
| 2006/0075219 A1* | 4/2006 | Callaghan | H04L 63/0823 713/156 |
| 2006/0168443 A1* | 7/2006 | Miller | H04L 12/58 713/156 |
| 2007/0168658 A1* | 7/2007 | Yamauchi | H04L 63/0823 713/156 |
| 2007/0260520 A1 | 11/2007 | Jha et al. | |
| 2008/0141026 A1 | 6/2008 | Cordery et al. | |
| 2012/0246466 A1* | 9/2012 | Salvarani | H04L 9/321 713/156 |
| 2015/0222604 A1* | 8/2015 | Ylonen | H04L 63/062 713/171 |
| 2015/0356511 A1 | 12/2015 | Campesi et al. | |
| 2016/0342429 A1* | 11/2016 | Johansson | H04L 63/0823 |
| 2017/0005808 A1 | 1/2017 | Gunti et al. | |

* cited by examiner

*Primary Examiner* — Mahfuzur Rahman

(57) ABSTRACT

In a computer-implemented method for automated provisioning a certificate in a computing system a certificate signing request is accessed from a computing node by a centralized management tool of the computing system. The certificate signing request is provided to a certificate authority by the centralized management tool. A signed certificate is accessed from the certificate authority for the computing node. The signed certificate is provided to the computing node, by the centralized management tool, such that there is automated provisioning of the signed certificate at the computing node to establish trust of the computing node in the computing system.

14 Claims, 10 Drawing Sheets

400

```
┌─────────────────────────────────────────────────────────┐
│ ACCESSING A SIGNED CERTIFICATE FROM A CERTIFICATE       │
│ AUTHORITY FOR A COMPUTING NODE, WHEREIN THE COMPUTING   │
│ NODE INITIALLY COMPRISES AN UNTRUSTED SELF-SIGNED       │
│ CERTIFICATE                                             │
│                          410                            │
└─────────────────────────────────────────────────────────┘
                              │
                              ▼
┌─────────────────────────────────────────────────────────┐
│ PROVIDING THE SIGNED CERTIFICATE TO THE COMPUTING NODE, │
│ BY THE CENTRALIZED MANAGEMENT TOOL, WHEREIN THE SIGNED  │
│ CERTIFICATE IS FOR REPLACING THE UNTRUSTED SELF-SIGNED  │
│ CERTIFICATE AT THE COMPUTING NODE SUCH THAT THERE IS    │
│ AUTOMATED PROVISIONING OF THE SIGNED CERTIFICATE AT THE │
│ COMPUTING NODE TO ESTABLISH TRUST OF THE COMPUTING NODE │
│ IN THE COMPUTING SYSTEM                                 │
│                          420                            │
└─────────────────────────────────────────────────────────┘
                              ┊
                              ▼
┌─────────────────────────────────────────────────────────┐
│ PROVIDING A CERTIFICATE REVOCATION LIST TO THE          │
│ COMPUTING NODE BY THE CENTRALIZED MANAGEMENT TOOL       │
│                          430                            │
└─────────────────────────────────────────────────────────┘
```

IN RESPONSE TO INITIATION OF ADDING OR RECONNECTING A COMPUTING NODE TO A COMPUTING SYSTEM, AUTOMATICALLY ACCESSING A CERTIFICATE EXPIRATION OF A CERTIFICATE OF THE COMPUTING NODE BY A CENTRALIZED MANAGEMENT TOOL OF THE COMPUTING SYSTEM
810

AUTOMATICALLY DETERMINING THE CERTIFICATE OF THE COMPUTING NODE HAS AN IMPENDING CERTIFICATE EXPIRATION, BY THE CENTRALIZED MANAGEMENT TOOL OF THE COMPUTING SYSTEM
820

IN RESPONSE TO THE AUTOMATICALLY DETERMINING, AUTOMATICALLY PROVIDING THE COMPUTING NODE A NEW CERTIFICATE TO REPLACE THE CERTIFICATE WITH THE IMPENDING CERTIFICATE EXPIRATION, BY THE CENTRALIZED MANAGEMENT TOOL OF THE COMPUTING SYSTEM
830

PERIODICALLY PUSHING CERTIFICATE REVOCATION LISTS TO THE COMPUTING NODE BY THE CENTRALIZED MANAGEMENT TOOL
840

FIG. 8

AUTOMATED PROVISIONING OF CERTIFICATES

CROSS-REFERENCE TO RELATED APPLICATIONS

This application is related to co-pending U.S. patent application Ser. No. 14/755,642, filed on Jun. 30, 2015, entitled "AUTOMATED MONITORING AND MANAGING OF CERTIFICATES," by Gunti et al., and assigned to the assignee of the present application.

BACKGROUND

Secure Sockets Layer/Transport Layer Security (SSL/TLS) is a protocol for securing traffic in a computing system/network. In general, SSL/TLS is used for establishing trust between two endpoints and the traffic is encrypted by the sender and decrypted by the receiver. In some instances, SSL thumbprint (or fingerprint) verification may be required. The management of SSL thumbprints is cumbersome and not specifically defined by any standard.

Additionally, provisioning of an endpoint with a signed certificate in the computing system/network requires manual procedures. Such manual procedures may increase chance of error and may be cumbersome to the user to maintain and manage thousands of endpoints in the computing system/network.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 4 depicts a flow diagram for a method for automated provisioning a certificate in a computing system, according to various embodiments.

FIG. 8 depicts a flow diagram for a method for automated remediation of certificate expiration, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

I. Automated Provisioning of Certificates

A. Distributed Computing System

Figure 1:
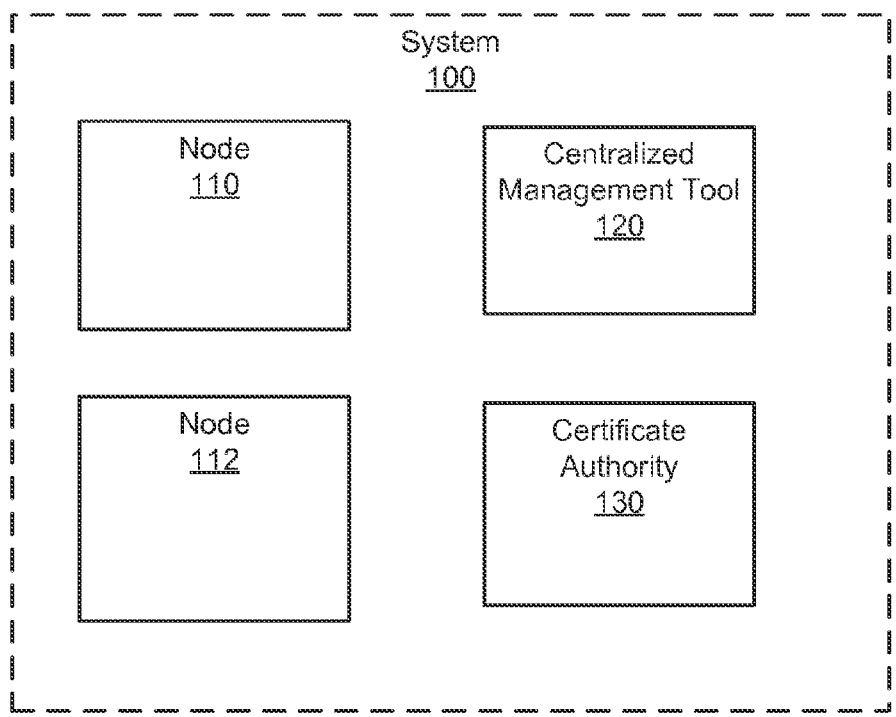
FIG. 1 depicts a block diagram of a distributed computing system, according to various embodiments.

FIG. 1 depicts an embodiment of a block diagram of computing system 100. Computing system 100 includes, among other things, a plurality of nodes or endpoints (e.g., nodes 110 and 112), centralized management tool 120 and certificate authority 130.

System 100 can be any computing system or network that includes various endpoints or computing nodes that are able to provide for communication within system 100. System 100 can be but is not limited a virtualization infrastructure, storage area network (SAN), etc. In one embodiment, system 100 is a distributed system.

Nodes 110 and 112 are any endpoint device or computing nodes that are able to communicate with one another in a networked environment. In one embodiment, the nodes are hosts (e.g., ESX hosts, ESXi hosts and the like) in a virtualization infrastructure that provides the underlying hardware for supporting virtual machines and their respective workloads. In another embodiment, the nodes are storage devices in a SAN. It should be appreciated that system 100 can include any number of nodes such as thousands of nodes.

Communication or data traffic within system 100, in one embodiment, is secured by the Secure Sockets Layer/Transport Layer Security (SSL/TLS) protocol, referred to herein as SSL, which is a standard security technology for establishing an encrypted link between nodes (e.g., a server and a client). As such, SSL allows sensitive information such as login credentials to be transmitted securely.

Centralized management tool 120 is a central management point for system 100. In general, centralized management tool 120 is a suite of virtualization tools (e.g., vSphere suite). For example, centralized management tool 120 allows for the management of multiple ESX servers and virtual machines from different ESX servers through a single console application. Centralized management tool 120 can be stored and executed on one the hosts (e.g., node 110 or node 112) or can be stored and executed on another physical device (e.g., client device) that is communicatively coupled with system 100.

Centralized management tool 120 enables a user (e.g., IT administrator) to manage system 100 from a single or centralized tool, via a user interface. For example, resource utilization and/or health of nodes may be controlled via centralized management tool 120.

Additionally, centralized management tool 120 enables for centralized management and automated provisioning of digital certificates to the nodes in system 100. For example, centralized management tool 120 automates the provisioning of SSL certificates to the nodes. In general, SSL Certificates are small data files that digitally bind a cryptographic key to an organization's details. When installed on a node, the certificate allows for secure connections with the node. In one embodiment, the digital certificates are X.509 certificates.

It should be appreciated that the centralized management and automated provisioning of digital certificates to the nodes in system 100 may be provided via a UI and/or APIs. Additionally, APIs at the host and centralized management tool level may be utilized to push certificates, keys, CRLs. Moreover, users may configure options to adjust notification levels, modes of operation, and certificate metadata via a UI and/or APIs.

Certificate authority 130 is an authorized authority that issues the certificates. In general, a certificate authority is an entity that issues digital certificates. A digital certificate certifies the ownership of a public key by the named subject of the certificate. This allows others (relying parties) to rely upon signatures or on assertions made by the private key that corresponds to the certified public key. In this model of trust relationships, a certificate authority is a trusted third party—trusted both by the subject (owner) of the certificate and by the party relying upon the certificate. In one embodiment, certificate authority 130 is provided and/or controlled by the entity that provides or develops centralized management tool (e.g., VMware). In another embodiment, certificate authority 130 is provided and/or controlled by an entity that is different than the entity that provides or develops the centralized management tool.

Certificate authority 130, in one embodiment, is a root certificate authority. In another embodiment, certificate authority 130 is an intermediary certificate authority to another certificate authority (not shown).

Various non-limiting embodiments of the SSL protocol relating to certificates are provided below:

SSL is used for establishing trust between two endpoints and then the traffic (data) is encrypted by the sender and decrypted by the receiver. Typically, SSL certificate validation is done by validating the certificate of the endpoint against a set of trusted root certificates. If no root certificate that can trust the endpoints' certificate is found, the certificate is deemed not trusted.

However, the above mechanism works when there are properly signed certificates used by the endpoints and when the relevant trusted root certificates are present on the client side.

In the cases where either the endpoint has self-signed certificates or the client does not have the relevant root certificates that signed the endpoints' certificates, an external entity (e.g., an administrator) can assign trust to that endpoints' certificate by explicitly telling the client to trust the incoming certificate. As a result, the client remembers some metadata of the incoming certificate (e.g., fingerprint of the certificate) such that it can trust that certificate later on. This mechanism is often called trust on first use (TOFU).

B. Method of Automated Provisioning of Digital Certificates

Figure 2:
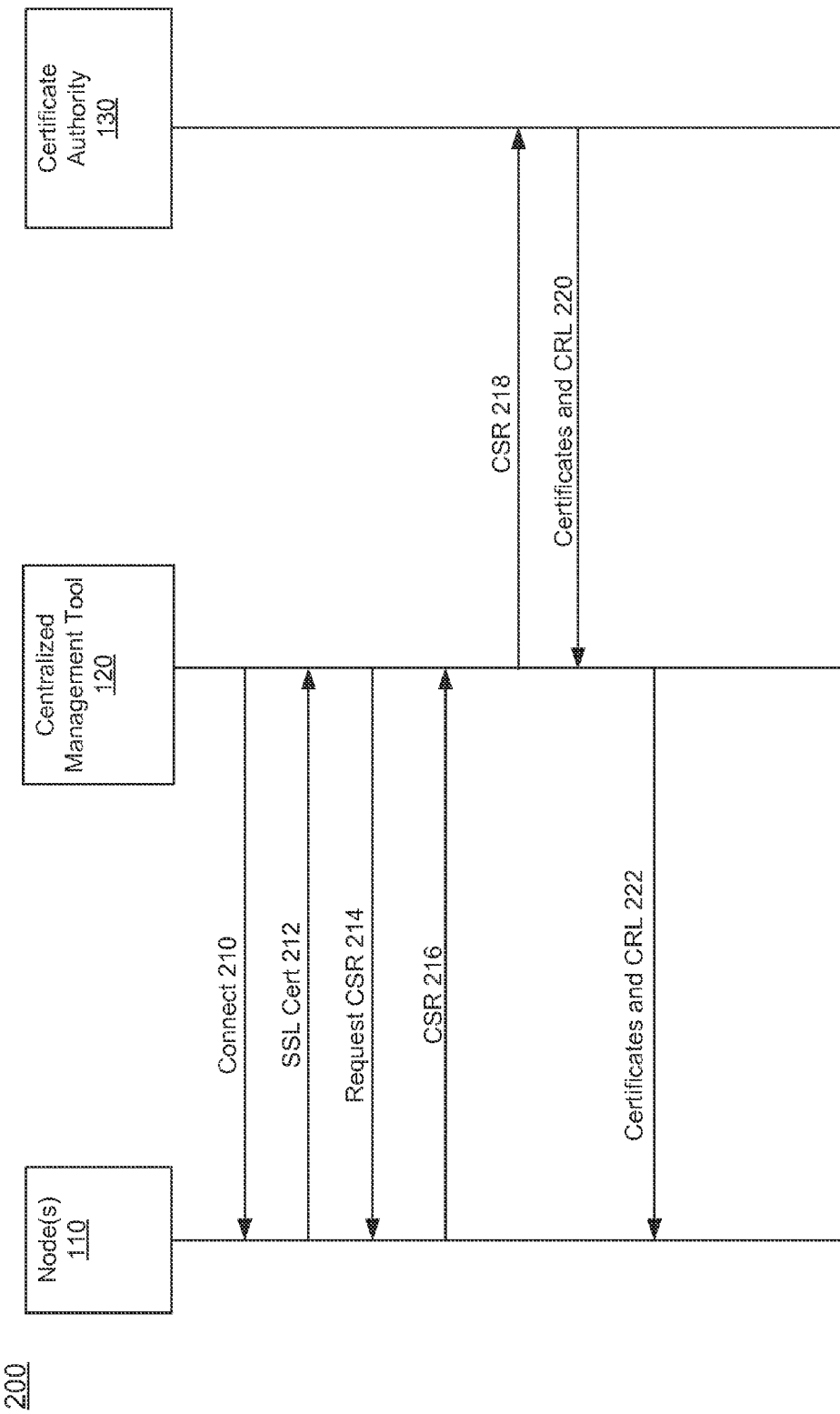
FIG. 2 depicts a flow diagram for a method for automated provisioning a certificate in a computing system, according to various embodiments.

FIG. 2 depicts an embodiment of a "swim lane" flow chart for a method 200 of automated provisioning of digital certificates.

At 210 of method 200, centralized management tool 120 connects/provisions node 110 to system 100. In one embodiment, node 110 is an ESX host that is configured to host various virtual machines in a virtualization infrastructure.

At 212, an unsigned SSL certification is transmitted to centralized management tool 120. It is noted that when node 110 is added to system 100, node 110 self-signs a certificate. However, a self-signed certificate is not deemed trustworthy in system 100. As such, communication with node 110 is not deemed to be to be trustworthy.

In one embodiment, subsequent step 212 (and prior to step 214), there is a resulting trust on first use. For example, the TOFU occurs based on the administrator assigns a trust to the endpoints' certificate by telling the client to trust the incoming certificate.

At 214, centralized management tool 120 requests a certificate signing request (CSR) from the node that is to be or just added to system 100. In general, a CSR is a message sent from an applicant to a certificate authority in order to apply for a digital identity certificate. Additionally, a CSR is a block of encrypted text that is generated on the server that the certificate will be used on. It contains information that will be included in the certificate such as your organization name, common name (domain name), locality, and country. It also contains the public key that will be included in the certificate. A private key is usually created at the same time that you create the CSR.

At 216, node 110 provides a CSR to centralized management tool 120.

At 218, centralized management tool 120 provides the CSR to certificate authority 130. That is, the centralized management tool presents the CSR to the certificate authority on behalf of the node. In one embodiment, certificate metadata is provided to certificate authority 130.

At 220, in response to receiving CSR from node 110 (via centralized management tool 120), certificate authority 130 generates certificates. For example, certificate authority 130 creates a certificate for node 110 and signs the certificate with a signing key.

The certificates the certificate authority generates may be, but is not limited to, a signed certificate, trusted certificate, root certificate, etc.

Additionally, certificate authority generates a certificate revocation list (CRL). In general, a CRL is a list of certificates (or a list of serial numbers for certificates) that have been revoked. Therefore, nodes or entities presenting those (revoked) certificates should no longer be trusted.

At 222, centralized management tool 120, upon receiving the certificates and CRL from certificate authority 130, transmits (e.g., pushes) the certificates and CRL to node 110. As a result, centralized management tool 120 automatically provisions node 110 with signed SSL certificates at the time node is added to system 100. Moreover, node 110 is trusted within system 100 at the time node is added to system 100. That is, the node is automatically trusted by any service that has the certificate authorities root certificate in its trust-store. In general, the root certificate is the signing certificate of the certificate authority that signs the node's certificate.

Upon receiving the certificates, node 110 refreshes its SSL context and starts using the new trusted certificates.

In various embodiments, node 110, prior to being added to or transitioning into system 100, may include older and untrustworthy certificates. In response, to receiving updated certificates and a CRL (as described in step 222), node 110 refreshes its SSL context and starts using the new trusted certificates.

C. Certificate Modes

Various modes can be utilized to provision certificates. Such modes can include a default mode, a custom certificate mode and a thumbprint mode.

The default mode, in one embodiment, is when certificate authority 130 is provided by the same entity (e.g., VMware) as the entity that provides centralized management tool 120. In such an embodiment, certificate authority 130 is a VMware certificate authority. Moreover, by default, the VMware certificate authority is used as the certificate authority for node certificates (e.g., ESXi host certificates). The VMware certificate authority is the root certificate authority by default, but it can be set up as an intermediary certificate authority to another certificate authority. In this mode, users can manage certificates from vSphere Web Client (e.g., centralized management tool 120).

The custom mode, in one embodiment, enables users to manage their own external certificate authority if they so desire. In this mode, customers are responsible for managing certificates.

The thumbprint mode, in one embodiment, is a fallback mode if, for example, the default mode is not working properly. In this mode, each of the certificates includes a thumbprint. The thumbprint is a hash value computed over the complete certificate, which includes all its fields, including the signature.

D. Example Methods of Operation

Figure 3:
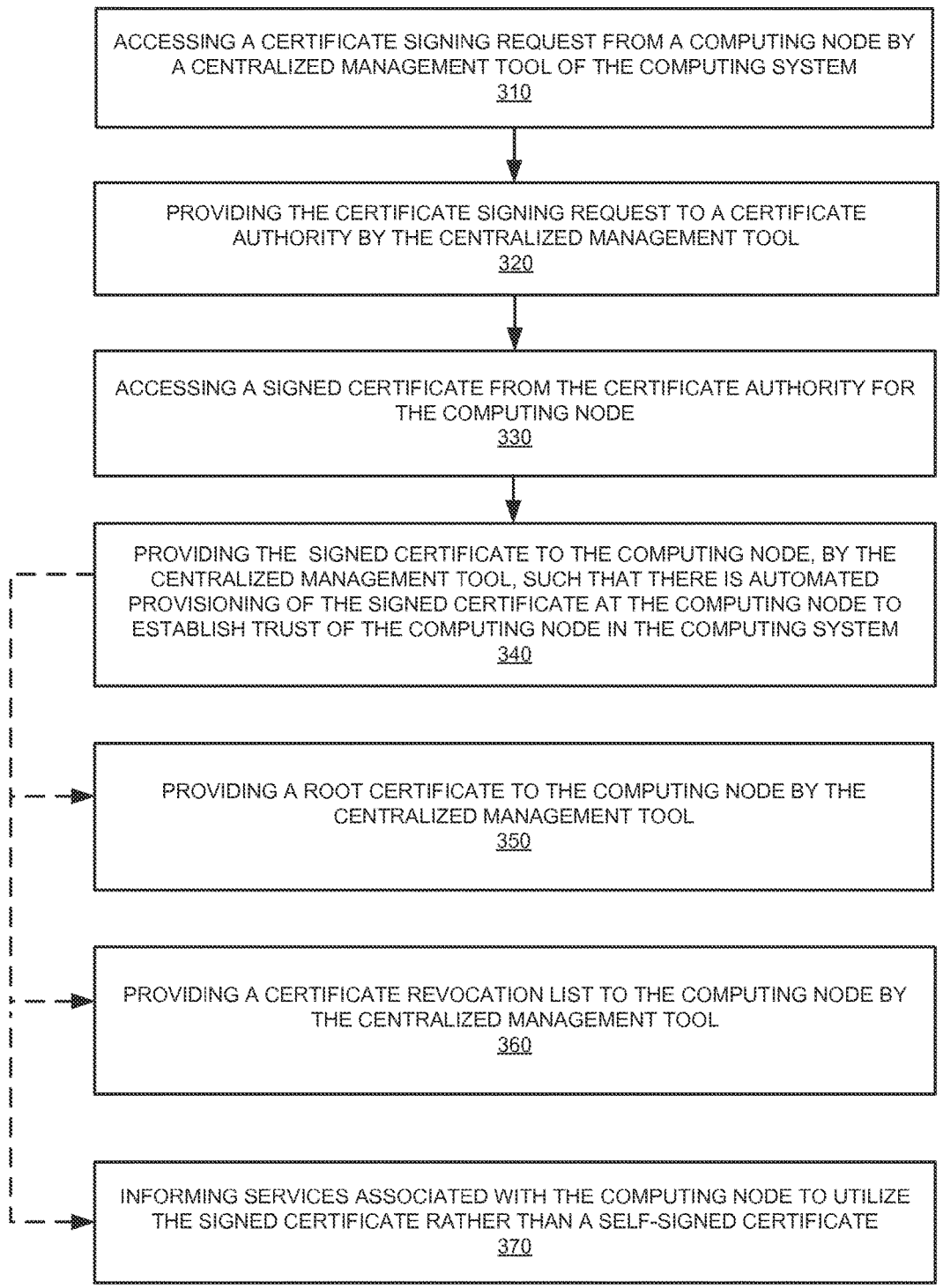
FIG. 3 depicts a flow diagram for a method for automated provisioning a certificate in a computing system, according to various embodiments.
Figure 5:
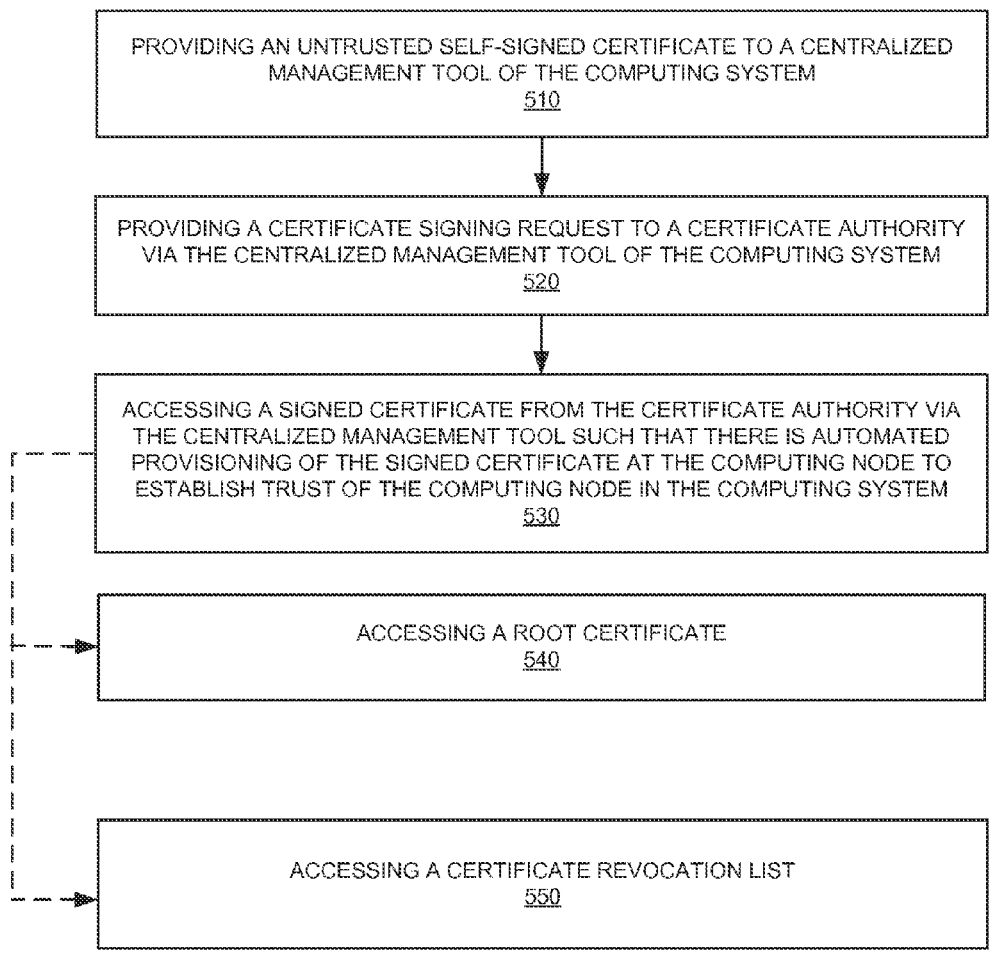
FIG. 5 depicts a flow diagram for a method for automated provisioning a certificate in a computing system, according to various embodiments.

The following discussion sets forth in detail the operation of some example methods of operation of embodiments. With reference to FIGS. 3, 4 and 5, flow diagrams 300, 400 and 500 illustrate example procedures used by various embodiments. Flow diagrams 300, 400 and 500 include some procedures that, in various embodiments, may include some steps that are carried out by a processor under the control of computer-readable and computer-executable instructions. In this fashion, procedures described herein and in conjunction with flow diagrams 300, 400 and 500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 300, 400 and 500 such procedures are examples. That is, embodiments are well suited to performing various other procedures or variations of the procedures recited in flow diagrams 300, 400 and 500. Likewise, in some embodiments, the procedures in flow diagrams 300, 400 and 500 may be performed in an order different than presented and/or not all of the procedures described in one or more of these flow diagrams may be performed.

FIG. 3 depicts a process flow diagram 300 of a method for automated provisioning a certificate in a computing system, according to various embodiments.

At 310, accessing a certificate signing request from a computing node by a centralized management tool of the computing system. For example, centralized management tool 120 receives a CSR from node 110 that is initiated to be added to system 100.

At 320, providing the certificate signing request to a certificate authority by the centralized management tool. For example, centralized management tool 120 transmits the CSR (received from node 110) to certificate authority 130.

At 330, accessing a signed certificate from the certificate authority for the computing node. For example, centralized management tool 120 receives signed X.509 certificates from certificate authority 130.

At 340, providing the signed certificate to the computing node, by the centralized management tool, such that there is automated provisioning of the signed certificate at the computing node to establish trust of the computing node in the computing system. For example, a node to be added to system 100 receives the signed certificates from centralized management tool 120. As a result, there is an establish trust of the computing node in the computing system.

At 350, providing a root certificate to the computing node by the centralized management tool. For example, certificate authority 130 provides a root certificate to centralized management tool 120 which then transmits the root certificate to node 110.

At 360, providing a certificate revocation list to the computing node by the centralized management tool. For example, certificate authority 130 provides a CRL to centralized management tool 120 which then transmits the CRL to node 110.

At 370, informing services associated with the computing node to utilize the signed certificate rather than a self-signed certificate. For example, by receiving signed certificates from centralized management tool 120 and refreshing its SSL context the services of node 110 are informed to use the newly provided certificates.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment.

FIG. 4 depicts a process flow diagram 400 of a method for automated provisioning a certificate in a computing system, according to various embodiments.

At 410, accessing a signed certificate from a certificate authority for a computing node, wherein the computing node initially comprises an untrusted self-signed certificate. For example, centralized management tool 120 receives signed certificates from certificate authority 130 for a node to be added to system 100. The node (e.g., node 110) to be added to system 100 initially includes an untrusted self-signed certificate.

At 420, providing the signed certificate to the computing node, by the centralized management tool, wherein the signed certificate is for replacing the untrusted self-signed certificate at the computing node such that there is automated provisioning of the signed certificate at the computing node to establish trust of the computing node in the computing system. For example, centralized management tool 120 transmits the signed certificates to the node to be added to system 100. The signed certificates replace other certificates (e.g., outdated certificates, untrusted certificates) of the node. As a result, there is automated provisioning of the signed certificates at the computing node to establish trust of the computing node in the computing system.

At 430, providing a certificate revocation list to the computing node by the centralized management tool. For example, centralized management tool 120 also provides a CRL to the node.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a process flow diagram 500 of a method for automated provisioning a certificate in a computing system, according to various embodiments.

At 510, providing an untrusted self-signed certificate to a centralized management tool of the computing system. For example, a node to be added to system 100 initially includes an untrusted self-signed certificate that is transmitted to centralized management tool 120.

At 520, providing a certificate signing request to a certificate authority via the centralized management tool of the computing system. For example, a CSR is transmitted from the node to centralized management tool 120.

At 530, accessing a signed certificate from the certificate authority via the centralized management tool such that there is automated provisioning of the signed certificate at the computing node to establish trust of the computing node in the computing system. For example, the node to be added to system 100 receives signed certificates from centralized management tool 120 (which received the certificates from certificate authority 130). As a result, there is automated provisioning of the signed certificate at the computing node to establish trust of the computing node in the computing system.

At 540, accessing a root certificate. For example, the node receives a root certificate from the certificate authority via centralized management tool 120.

At 550, accessing a certificate revocation list. For example, the node receives a CRL from the certificate authority via centralized management tool 120.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

II. Automated Monitoring and Managing of Certificates

As will be described in further detail below, centralized management tool 120 provides various automated and centralized monitoring and managing of certificates for nodes in system 100.

A. Automated Monitoring of Certificate Expiration

Centralized management tool 120, in various embodiments, provides for automated monitoring of certificate expiration. That is, centralized management tool 120 periodically monitors for the expiration of certificates in a node.

A signed certificate (e.g., X.509 certificate) includes a certificate expiration. In particular, when the signed certificate is signed or created the certificate includes certificate expiration that indicates when the certificate will expire and no longer trusted. If the certificate is not updated by the time the certificate expiration is met, then the certificate expires. As a result, the node that includes the expired certificate is deemed to not be trusted in system 100.

Centralized management tool 120, in various embodiments, periodically (e.g., daily, weekly, etc.) accesses the nodes in system 100 to determine the certificate expiration of the certificates in the nodes. If it is determined that a certificate of a node has an impending certificate, then centralized management tool 120 automatically creates an alert to indicate that the certificate may expire soon.

An alert may be generated in response to various time thresholds. Alerts may be presented to a use via a UI of the centralized management tool. For example, if a certificate is impending to expire within a first threshold (e.g., 8 months), then an alert is generated. The first threshold may be considered a green status.

Likewise, if a certificate is impending to expire within a second threshold (e.g., 1-8 months), then an alert is generated with a higher importance than the alert based on the first threshold. The second threshold may be considered a soft threshold or a yellow status.

On a receipt of an alert of a certificate in a threshold (e.g., soft threshold), the administrator may choose to manually refresh the certificates on the corresponding node. Alternatively, centralized management tool 120 may automatically refresh the certificates in certain cases, such as when the node whose certificate is in the soft (or hard) threshold is being added to the inventory of the centralized management tool.

Similarly, if a certificate is impending to expire within a third threshold (e.g., 1 month), then an alert is generated with a higher importance than the alert based on the second threshold. The third threshold may be considered a hard threshold or red status.

In various embodiments, if the administrator does not respond to this alert and/or does not manually refresh the certificates, centralized management tool 120 may automatically provide new certificates to the node.

The alerts of the impending expiration of certificates facilitates in the prevention of actual certificate expiration.

B. Automated Remediation of Certificate Expiration

Centralized management tool 120, in various embodiments, provides for automated remediation of certificate expiration. In particular, when a node is added to or reconnected to the computing system, centralized management tool 120 automatically accesses certificates in the node and automatically determines the certificate expiration of the certificates.

If it is determined that a certificate has an impending certificate expiration, then centralized management tool 120 automatically provides the node new certificate to replace the certificate with an impending certificate expiration.

An impending certificate expiration is determined based on various time thresholds, as described above. For example, if a certificate is set to expire within a first time frame (e.g., 8 months), then it is determined that the certificate has an impending certificate expiration. Likewise, if a certificate is set to expire within a second time frame (e.g., 1-8 months), then it is determined that the certificate has an impending certificate expiration. Similarly, if a certificate is set to expire within a third time frame (e.g., 1 month), then it is determined that the certificate has an impending certificate expiration.

C. Automated Pushing of a Certificate Revocation List

Centralized management tool 120, in various embodiments, provides for automated pushing of a CRL. For example, in response to revocation of a computing node (e.g., node 110) in computing system 100, centralized management tool 120 receives an updated CRL from certificate authority 130 and then automatically provides the CRL to other nodes in the computing system (e.g., node 112). The updated CRL indicates that the certificates associated with the revoked node are untrustworthy. As a result, other nodes in the computing system are aware that the revoked node is untrustworthy.

Figure 6:
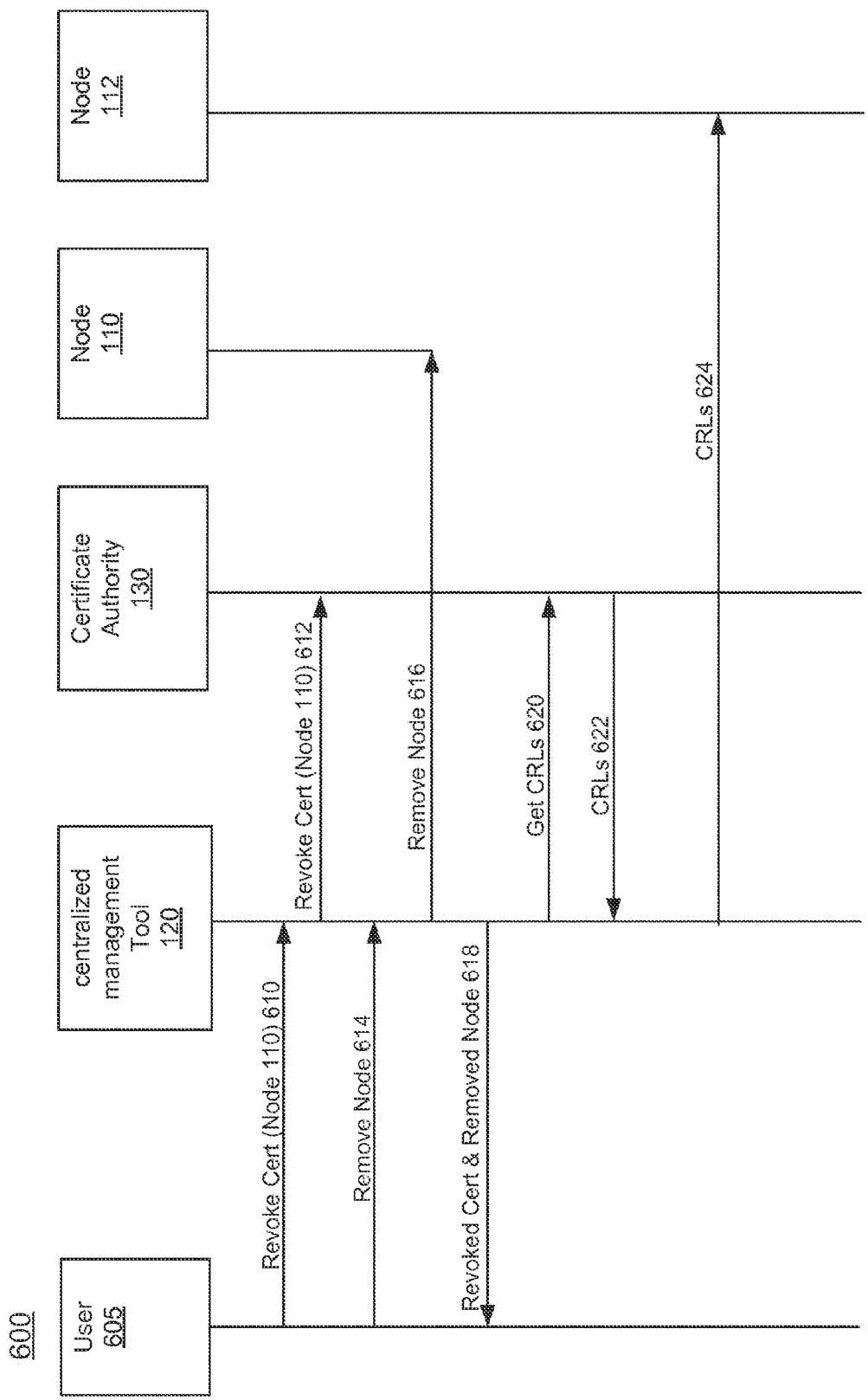
FIG. 6 depicts a flow diagram for a method for automated pushing of a certificate revocation list, according to various embodiments.

FIG. 6 depicts an embodiment of a "swim lane" flow chart for a method 600 of automated pushing of a CRL.

At 610, user 605 (e.g., administrator of system 100) revokes certificates in node 110 by way of centralized management tool 120. For example, the user is made aware that node 110 is untrustworthy and desires to revoke certificates of node 110 via a UI or CLI.

At 612, centralized management tool 120 transmits instructions to certificate authority 130 to revoke the certificates of node 110 (as instructed by user 605). As a result, node 110 is deemed to be untrustworthy.

At 614, the user provides instructions to remove node 110 from the system because it is untrustworthy.

At 616, centralized management tool 120 removes node 110 from system 100. As a result, node 110 is no longer a security risk to system 100.

At 618, centralized management tool 120 provides indication to user 605 that the certificates of node 110 were revoked and the node was removed from system 100.

At 620, centralized management tool 120 requests CRLs from certificate authority 130.

At 622, certificate authority 130 transmits updated CRLs to centralized management tool 120. The CRLs indicate that the certificates in node 110 are revoked and that node 110 is removed from system 100.

At 624, centralized management tool 120 transmits the updated CRLs to node 112 (and other nodes in system 100). As a result, node 112 (and other nodes in system 100) are aware that the certificates in node 110 are revoked and therefore node 110 is untrustworthy.

D. Example Methods of Operation

Figure 7:
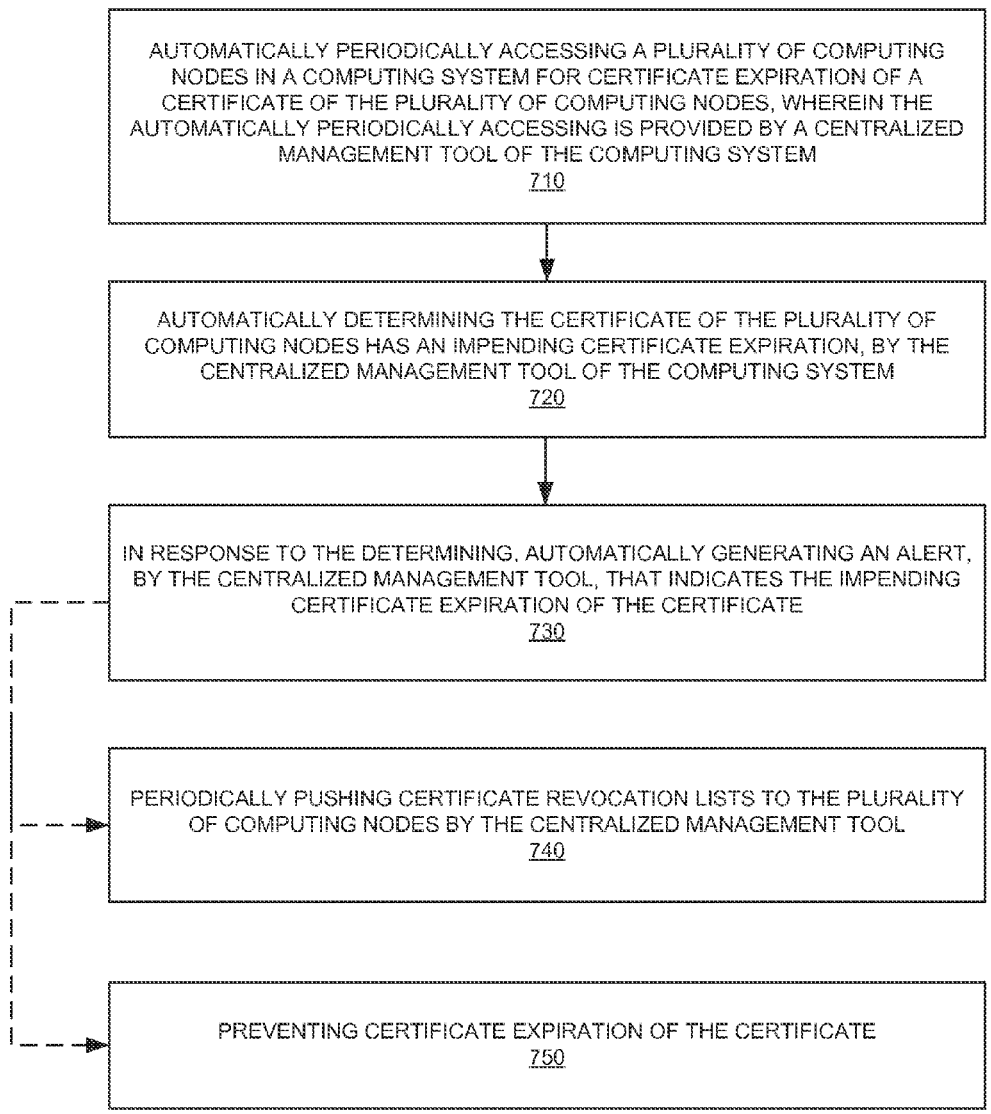
FIG. 7 depicts a flow diagram for a method for automated monitoring of certificate expiration, according to various embodiments.
Figure 9:
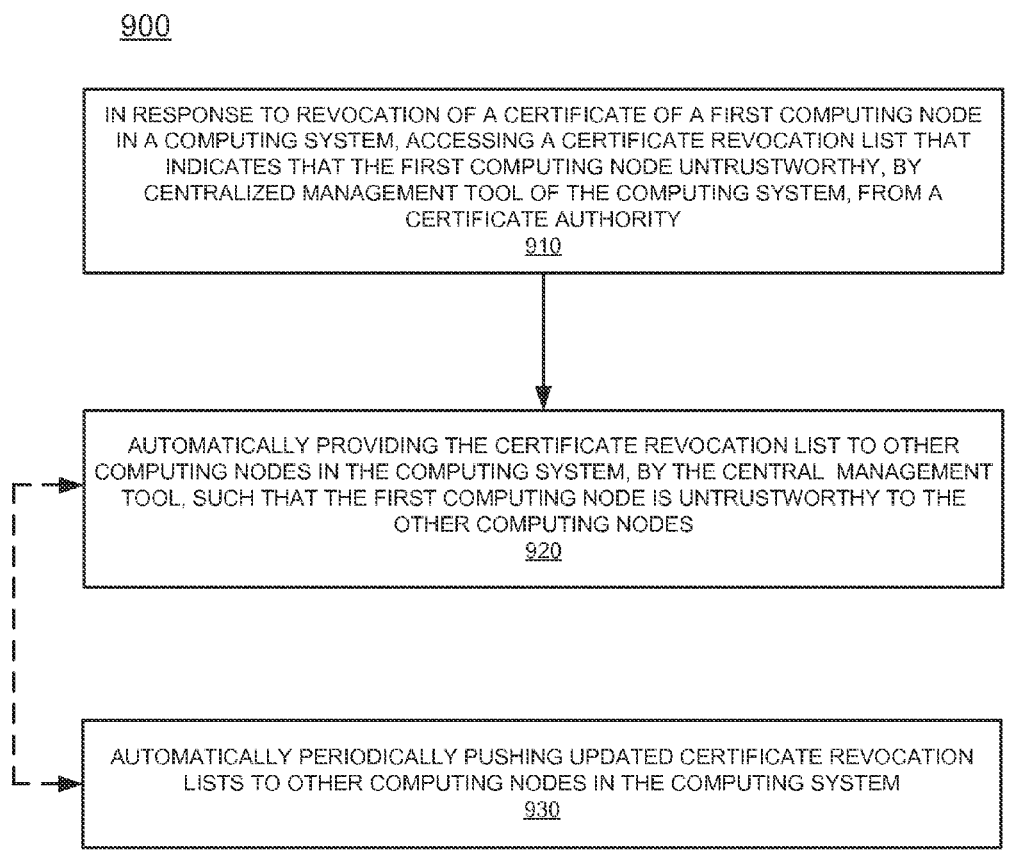
FIG. 9 depicts a flow diagram for a method automated pushing of a certificate revocation list, according to various embodiments.

The following discussion sets forth in detail the operation of some example methods of operation of embodiments. With reference to FIGS. 7, 8 and 9, flow diagrams 700, 800 and 900 illustrate example procedures used by various embodiments. Flow diagrams 700, 800 and 900 include some procedures that, in various embodiments, may include some steps that are carried out by a processor under the control of computer-readable and computer-executable instructions. In this fashion, procedures described herein and in conjunction with flow diagrams 700, 800 and 900 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 700, 800 and 900 such procedures are examples. That is, embodiments are well suited to performing various other procedures or variations of the procedures recited in flow diagrams 700, 800 and 900. Likewise, in some embodiments, the procedures in flow diagrams 700, 800 and 900 may be performed in an order different than presented and/or not all of the procedures described in one or more of these flow diagrams may be performed.

FIG. 7 depicts a process flow diagram 700 of a method for automated monitoring certificate expiration, according to various embodiments.

At 710, automatically periodically accessing a plurality of computing nodes in a computing system for certificate expiration of a certificate of the plurality of computing nodes, wherein the automatically periodically accessing is provided by a centralized management tool of the computing system. For example, centralized management tool 120 automatically and periodically accesses certificate expiration of certificates of the nodes in system 100. The centralized management tool may access the nodes for the certification expiration daily, every day, every other day, weekly, etc.

At 720, automatically determining the certificate of the plurality of computing nodes has an impending certificate expiration, by the centralized management tool of the computing. For example, centralized management tool 120 automatically determines whether or not any of the certificates have an impending certificate expiration.

At 730, in response to the determining, automatically generating an alert, by the centralized management tool, that indicates the impending certificate expiration of the certificate. If it is determined that a certificate has an impending certificate expiration, the centralized management tool generates an alert and presents the alert the user such that the user is aware of the impending certificate expiration.

At 740, periodically pushing certificate revocation lists to the plurality of computing nodes by the centralized management tool. For example, the centralized management tool periodically provides CRLs to nodes in system 100. As a result, the nodes are made aware of certificates that are revoked and therefore do not trust the nodes with the revoked certificates.

At 750, preventing certificate expiration of the certificate. For example, by alerting a user of impending certificate expiration, the user may direct the centralized management tool to replace the impending expiring certificates with new certificates. As a result, the certificates are prevented from expiring.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

FIG. 8 depicts a process flow diagram 800 of a method for automated remediation of certificate expiration, according to various embodiments.

At 810, in response to initiation of adding or reconnecting a computing node to a computing system, automatically accessing a certificate expiration of a certificate of the computing node by a centralized management tool of the computing system. For example, a user directs centralized management tool 120 to add or reconnect a node (e.g., host, storage device) to system 100. Then centralized management tool 120 automatically accesses the certificate expiration of any certificates in the node.

At 820, automatically determining the certificate of the computing node has an impending certificate expiration, by the centralized management tool of the computing system. For example, upon accessing the certificate expiration, centralized management tool 120 then determines whether or not the certificate has an impending certificate expiration.

At 830, in response to the automatically determining, automatically providing the computing node a new certificate to replace the certificate with the impending certificate expiration, by the centralized management tool of the computing system. For example, if it determined that there is an impending certificate expiration, then centralized management tool 120 automatically provides the computing node with a new certificate (that does not have an impending expiration) to replace the certificate with the impending certificate expiration.

At 840, periodically pushing certificate revocation lists to the computing node by the centralized management tool. For example, the centralized management tool periodically provides CRLs to nodes in system 100. As a result, the nodes are made aware of certificates that are revoked and therefore do not trust the nodes with the revoked certificates.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

FIG. 9 depicts a process flow diagram 900 of a method for automated pushing of a certificate revocation list, according to various embodiments.

At 910, in response to revocation of a certificate of a first computing node in a computing system, accessing a certificate revocation list that indicates that the first computing node untrustworthy, by centralized management tool of the computing system, from a certificate authority. For example, if a certificate of node 110 is revoked, then an updated CRL that indicates that the certificate is revoked is created by the certificate authority and provided to the centralized management tool.

At 920, automatically providing the certificate revocation list to other computing nodes in the computing system, by the centralized management tool, such that the first computing node is untrustworthy to the other computing nodes. For example, centralized management tool 120 pushes the updated CRL to other nodes in the system. As a result, the other nodes are made aware that the first node is untrustworthy.

At 930, automatically periodically pushing updated certificate revocation lists to other computing nodes in the computing system. For example, the centralized management tool periodically provides CRLs to nodes in system 100. As a result, the nodes are made aware of certificates that are revoked and therefore do not trust the nodes with the revoked certificates.

It is noted that any of the procedures, stated above, regarding flow diagram 900 may be implemented in hardware, or a combination of hardware with firmware and/or software. For example, any of the procedures are implemented by a processor(s) of a cloud environment and/or a computing environment.

E. Example Host Computer System

As described above, computing system 100, in one embodiment, is a virtualized computing environment, wherein the nodes are hosts (or host computing system) within the virtualized computing environment.

Figure 10:
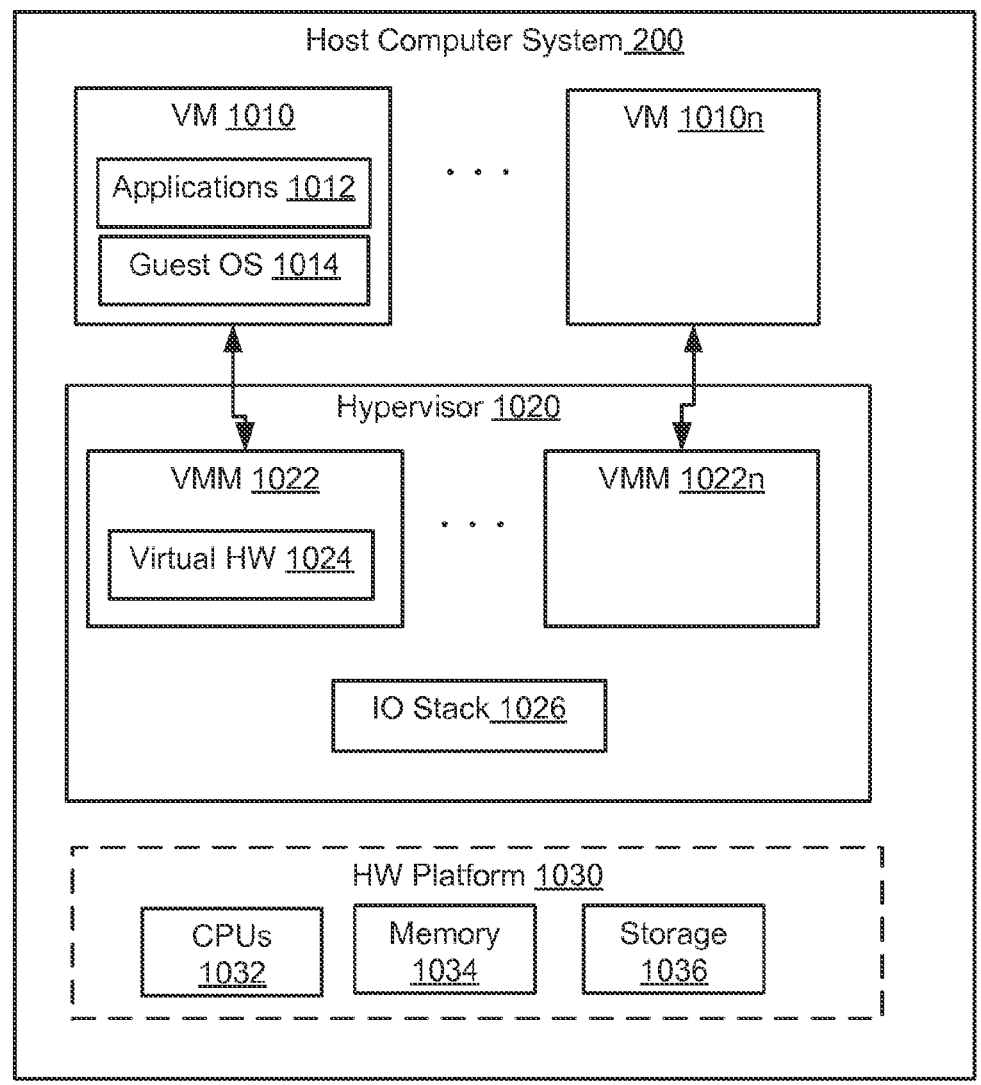
FIG. 10 depicts a block diagram of a host computing system, according to various embodiments.

FIG. 10 is a schematic diagram that illustrates a virtualized computer system that is configured to carry out one or more embodiments of the present invention. The virtualized computer system is implemented in a host computer system 1000 including hardware platform 1030. In one embodiment, host computer system 1000 is constructed on a conventional, typically server-class, hardware platform.

Hardware platform 1030 includes one or more central processing units (CPUs) 1032, system memory 1034, and storage 1036. Hardware platform 1030 may also include one or more network interface controllers (NICs) that connect host computer system 1000 to a network, and one or more host bus adapters (HBAs) that connect host computer system 1000 to a persistent storage unit.

Hypervisor 1020 is installed on top of hardware platform 1030 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 1024 for virtual machine 1010 supports the installation of guest OS 1014 which is capable of executing applications 1012 within virtual machine 1010.

Guest OS 1014 may be any of the well-known commodity operating systems, and includes a native file system layer, for example, either an NTFS or an ext3FS type file system layer. IOs issued by guest OS 1014 through the native file system layer appear to guest OS 1014 as being routed to one or more virtual disks provisioned for virtual machine 1010 for final execution, but such IOs are, in reality, reprocessed by IO stack 1026 of hypervisor 1020 and the reprocessed IOs are issued, for example, through an HBA to a storage system.

Virtual machine monitor (VMM) 1022 and 1022*n* may be considered separate virtualization components between the virtual machines and hypervisor 1020 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method for automated provisioning of a certificate in a computing system, said computer-implemented method comprising:
    accessing a certificate signing request from a computing node by a centralized management tool of said computing system,
        wherein the computing node is a host in a virtualization infrastructure that provides underlying hardware for supporting a virtual machine (VM) and a workload of the VM, and
        wherein the centralized management tool is stored and executed on a single client device communicatively coupled with said computing system;
    providing said certificate signing request to a certificate authority by said centralized management tool;
    accessing a signed certificate from said certificate authority for said computing node; and
    providing said signed certificate to said computing node, by said centralized management tool, wherein said signed certificate replaces a self-signed certificate at said computing node such that there is automated provisioning of said signed certificate at said computing node to establish trust of said computing node in said computing system.

2. The computer-implemented method of claim 1, wherein said computing node is a storage device in a storage area network.

3. The computer-implemented method of claim 1, wherein said signed certificate is a X.509 certificate.

4. The computer-implemented method of claim 1, further comprising:
    providing a root certificate to said computing node by said centralized management tool.

5. The computer-implemented method of claim 1, further comprising:
    providing a certificate revocation list to said computing node by said centralized management tool.

6. The computer-implemented method of claim 1, further comprising:
    informing services associated with said computing node to utilize said signed certificate rather than a self-signed certificate.

7. A non-transitory computer-readable storage medium having instructions embodied therein that when executed cause a computer system to perform a method of automated provisioning of a certificate in a computing system, the method comprising:
    accessing a signed certificate from a certificate authority for a computing node, by a centralized management tool, wherein said computing node initially comprises an untrusted self-signed certificate,
        wherein the computing node is a host in a virtualization infrastructure that provides underlying hardware for supporting a virtual machine (VM) and a workload of the VM, and
        wherein the centralized management tool is stored and executed on a single client device communicatively coupled with said computing system; and
    providing said signed certificate to said computing node, by said centralized management tool, wherein said signed certificate replaces said untrusted self-signed certificate at said computing node such that there is automated provisioning of said signed certificate at said computing node to establish trust of said computing node in said computing system.

8. The non-transitory computer-readable storage medium of claim 7, wherein said computing node is a storage device.

9. The non-transitory computer-readable storage medium of claim 7, further comprising:
    providing a certificate revocation list to said computing node by said centralized management tool.

10. A computer-implemented method for automated provisioning of a certificate in a computing system, said computer-implemented method comprising:
    providing an untrusted self-signed certificate to a centralized management tool of said computing system,
        wherein the centralized management tool is stored and executed on a single client device communicatively coupled with said computing system;
    providing a certificate signing request to a certificate authority via said centralized management tool of said computing system; and
    accessing a signed certificate from said certificate authority via said centralized management tool, wherein services associated with said computing node utilize said signed certificate rather than said untrusted self-signed certificate such that there is automated provisioning of said signed certificate at a computing node to establish trust of said computing node in said computing system, wherein the computing node is a host in a virtualization infrastructure that provides underlying hardware for supporting a virtual machine (VM) and a workload of the VM.

11. The computer-implemented method of claim 10, wherein said computing node is a storage device.

12. The computer-implemented method of claim 10, wherein said signed certificate is a X.509 certificate.

13. The computer-implemented method of claim 10, further comprising:
accessing a root certificate.

14. The computer-implemented method of claim 10, further comprising:
accessing a certificate revocation list.

* * * * *